H. W. PLEISTER.
CONDUIT OR CABLE CLAMP AND BRIDLE RING.
APPLICATION FILED AUG. 17, 1920.
1,381,230.
Patented June 14, 1921.
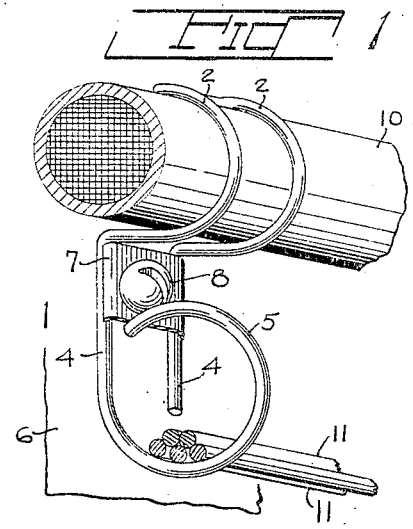
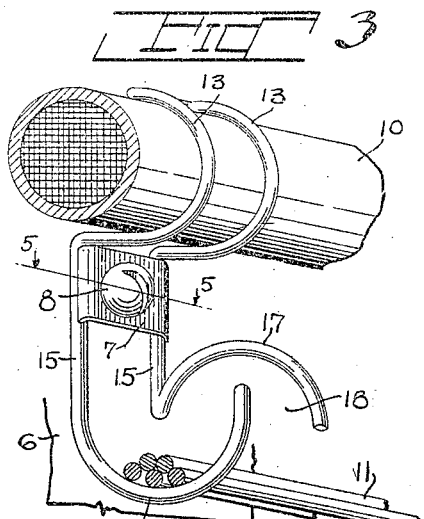
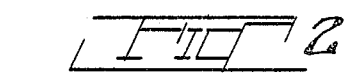
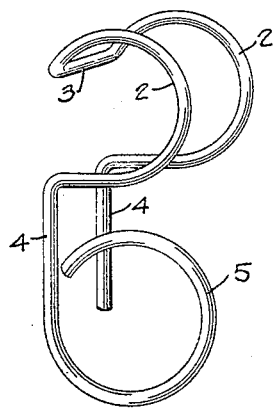
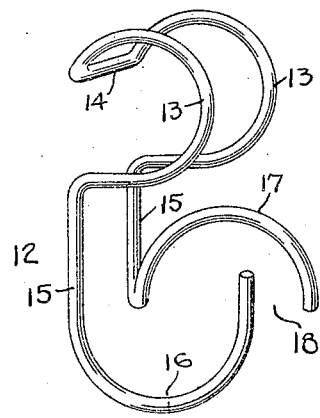
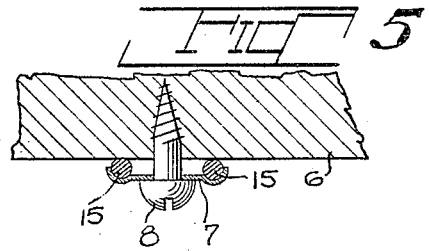
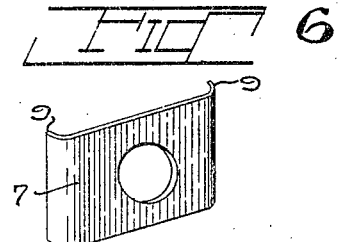
INVENTOR
Henry W. Pleister
BY
Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,381,230.　　　　Specification of Letters Patent.　　Patented June 14, 1921.

Application filed August 17, 1920. Serial No. 404,169.

*To all whom it may concern:*

Be it known that I, HENRY W. PLEISTER, a citizen of the United States, residing at Westfield, in the county of Union and State of New Jersey, have made certain new and useful Improvements in Conduit or Cable Clamps and Bridle-Rings, of which the following is a specification, taken in connection with the accompanying drawings.

My invention relates to a conduit or cable clamp and more particularly to one formed from wire. It further relates to such a wire conduit or cable clamp having an integral bridle ring formed either on one arm of the base of the clamp, or partly on each arm of the base. My invention further relates to the combination of such a combined wire conduit or cable clamp and bridle ring and a saddle to secure it to a wall or other suitable support.

In the figures, in which I have shown one embodiment of my invention, the same reference numerals refer to similar parts in the several figures.

Figure 1 is a perspective view of my wire conduit or cable clamp shown supporting a cable and runs of bridle wires.

Fig. 2 is a detail perspective view of the form of combined wire clamp and bridle ring shown in Fig. 1;

Fig. 3 is a perspective view of a modified form of my combined wire conduit or cable clamp and bridle ring in its operative position shown supporting a cable and runs of bridle wires.

Fig. 4 is a detail perspective view of the combined wire conduit or cable clamp and bridle ring shown in Fig. 3;

Fig. 5 is a horizontal section on line 5—5 of Fig. 3, looking down in the direction of the arrows;

Fig. 6 is a perspective view of a saddle.

Prior to my invention it has been customary to support the heavy lead covered conduits or cables 1 by means of cable clamps formed from heavy castings of iron or similar metal, and also by cable clamps formed from pressed sheet steel. By my invention I form a much cheaper conduit or cable clamp which will do the heavy duty required to support the heavy lead covered cables and which will not bend or break under the heavy normal strains, nor will it fail under abnormal strains due to sleet, wind and ice. In such cast or pressed steel cable clamps it is customary to add to them separate bridle rings to string runs of bridle wires.

In my invention I form a combined wire conduit or cable clamp and bridle ring 1 by bending the wire back on itself to form the wire hooks 2, 2 and connecting portion 3. The ends of the wires are then bent to form arms 4, 4, the said arms forming the base of the clamp.

One or both of these arms 4, 4, may be extended to form either a complete bridle ring, or form between them an open bridle ring.

In Figs. 1 and 2 one of the arms 4 is extended and bent back on itself to form the open bridle ring 5.

The cable 10, usually extremely heavy and lead covered, is supported on the wall or other suitable support 6 by the conduit or cable clamp 1, the saddle 7 and the securing screw 8. This saddle is preferably provided with curved ends 9, 9 which take over the wire arms 4, 4 and prevent their lateral displacement.

In my invention the bridle ring is mounted as soon as is the cable. The runs of bridle wires 11, 11 can then be strung through the bridle ring. Generally these bridle wires are not mounted until it is necessary to increase the capacity of the installation. When that need arises these bridle wires can be immediately supported without the lineman adding any additional mechanical supporting means to the wire conduit or cable clamp.

Various changes in the form of the bridle ring may be made. I have shown by way of example a combined wire conduit or cable clamp and bridle ring 12, Figs. 3 and 4, having the double wire hooks 13, 13 and connecting member 14. The strands of the wire are bent to form the arms 15, 15, and each arm is extended and bent to form between them a bridle ring. One arm is extended and bent up to form the hook 16, and the other is extended and bent to form the guard 17, the hook 16 and the guard 17 forming a bridle ring having the opening 18.

The runs of bridle wires 11, 11 can be slipped through the opening or throat 18 and will be supported on the member 16 while the guard 17 will prevent them becoming disengaged.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising a wire conduit or cable clamp having a plurality of wire hooks to support a cable and a plurality of arms to form a base, one of the arms being extended and bent to form a bridle ring, the other arm being extended and bent to form a guard.

2. A wire conduit or cable clamp having two wire hooks to support a cable and two wire arms to form a base, both arms being extended and bent upon themselves to form an open bridle ring.

HENRY W. PLEISTER.

Witnesses:
MARY R. RYAN,
ELIZABETH J. ROTH.